(12) United States Patent
Arguelles et al.

(10) Patent No.: US 10,719,427 B1
(45) Date of Patent: Jul. 21, 2020

(54) CONTRIBUTED TEST MANAGEMENT IN DEPLOYMENT PIPELINES

(71) Applicant: AMAZON TECHNOLOGIES, INC., Seattle, WA (US)

(72) Inventors: Carlos Alejandro Arguelles, Shoreline, WA (US); Simon Kurt Johnston, Bellevue, WA (US); Wes McDaniel, Bothell, WA (US); David Panko, Kirkland, WA (US); Darrin Prutsman, Bothell, WA (US); Harpreet Singh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 15/586,831

(22) Filed: May 4, 2017

(51) Int. Cl.
*G06F 9/44* (2018.01)
*G06F 11/36* (2006.01)
*G06F 8/65* (2018.01)

(52) U.S. Cl.
CPC .............. *G06F 11/368* (2013.01); *G06F 8/65* (2013.01); *G06F 11/3684* (2013.01); *G06F 11/3688* (2013.01)

(58) Field of Classification Search
CPC .......... G06F 11/3668; G06F 11/3672; G06F 11/368; G06F 11/3688; G06F 11/3692; G06F 8/65; G06F 8/66; G06F 8/70; G06F 8/71; G06F 8/654–658; G06Q 30/01; G06Q 30/018; G06Q 10/06395; G06Q 10/0639
See application file for complete search history.

(56) References Cited

U.S. PATENT DOCUMENTS

| | | | | | |
|---|---|---|---|---|---|
| 5,844,971 | A | * | 12/1998 | Elias | G06F 17/243 379/100.11 |
| 6,522,995 | B1 | * | 2/2003 | Conti | G06F 11/3414 702/183 |
| 7,058,704 | B1 | * | 6/2006 | Mangipudi | H04L 41/5009 370/235 |

(Continued)

FOREIGN PATENT DOCUMENTS

CN 101727390 A * 6/2010 .............. G06F 11/36

OTHER PUBLICATIONS

Clemson, Toby. "Testing Strategies in a Microservice Architecture" Nov. 18, 2014. Retrieved from https://martinfowler.com/articles/microservice-testing/fallback.html on Aug. 21, 2018. (Year: 2014).*

(Continued)

*Primary Examiner* — Hiren P Patel
(74) *Attorney, Agent, or Firm* — Lowenstein Sandler LLP

(57) ABSTRACT

A contributed test management system receives a first request from a consumer system, where the first request comprises a request for a contributed test to be added to a deployment pipeline of a producer system, and where the contributed test is associated with an application component in the deployment pipeline. The contributed test management system causes the contributed test to test a code update provided by the producer system for the application component in the deployment pipeline, detects whether the first test fails during execution, and, if so indicates to the consumer system that the first test has failed.

17 Claims, 7 Drawing Sheets

(56) References Cited

U.S. PATENT DOCUMENTS

| | | | |
|---|---|---|---|
| 7,475,289 B2* | 1/2009 | Rosaria | G06F 11/3672 714/38.1 |
| 8,254,848 B1* | 8/2012 | Elliott | H04B 7/022 370/242 |
| 9,229,845 B1* | 1/2016 | Chandrasekharapuram | G06F 11/3692 |
| 9,300,759 B1* | 3/2016 | Jorgensen | G06F 9/541 |
| 9,336,109 B2* | 5/2016 | Atkinson | G06F 11/263 |
| 9,514,034 B1* | 12/2016 | Griffin | G06F 11/3688 |
| 9,710,368 B1* | 7/2017 | Gundeti | G06F 11/3688 |
| 10,289,539 B1* | 5/2019 | Arguelles | G06F 11/3692 |
| 2003/0065990 A1* | 4/2003 | Barford | G06F 11/221 714/704 |
| 2006/0075304 A1* | 4/2006 | Canning | G06F 11/0748 714/38.11 |
| 2006/0107121 A1* | 5/2006 | Mendrala | G06F 11/3688 714/38.1 |
| 2006/0155633 A1* | 7/2006 | Fellenstein | G06Q 10/06 705/37 |
| 2006/0184918 A1* | 8/2006 | Rosaria | G06F 11/3672 717/124 |
| 2007/0168734 A1* | 7/2007 | Vasile | G06F 11/3672 714/33 |
| 2008/0222501 A1* | 9/2008 | Travison | G06F 11/366 714/819 |
| 2009/0158287 A1* | 6/2009 | Cardelli | G06F 9/5038 718/102 |
| 2009/0281818 A1* | 11/2009 | Li | G06Q 10/04 705/301 |
| 2010/0100871 A1* | 4/2010 | Celeskey | G06F 11/008 717/124 |
| 2010/0218188 A1* | 8/2010 | Jackson | G06F 11/3419 718/100 |
| 2012/0204153 A1* | 8/2012 | Peterson | G06F 11/3672 717/124 |
| 2013/0111267 A1* | 5/2013 | Beryoza | G06F 11/3688 714/32 |
| 2013/0185595 A1* | 7/2013 | D'Alterio | G06F 11/3684 714/38.1 |
| 2013/0212277 A1* | 8/2013 | Bodik | G06F 9/4887 709/226 |
| 2014/0047040 A1* | 2/2014 | Patiejunas | H04L 51/24 709/206 |
| 2014/0059386 A1* | 2/2014 | Atkinson | G06F 11/263 714/33 |
| 2014/0109051 A1* | 4/2014 | McDonald | G06F 8/30 717/124 |
| 2015/0381709 A1* | 12/2015 | Word | H04L 49/90 709/203 |
| 2016/0155131 A1* | 6/2016 | Miloslavsky | G06F 11/3672 705/317 |
| 2016/0308745 A1* | 10/2016 | Couture | H04L 43/10 |
| 2017/0262361 A1* | 9/2017 | Francis | G06F 11/3688 |
| 2018/0032428 A1* | 2/2018 | Gundeti | G06F 11/3688 |

OTHER PUBLICATIONS

Somsorn et al.; "Stopping criteria for regression testing in GUI application using failure intensity and failure reliability"; IEEE 2015 (Somsorn_2015.pdf; pp. 1-4) (Year: 2015).*

* cited by examiner

CONTRIBUTED TEST MANAGEMENT IN DEPLOYMENT PIPELINES

BACKGROUND

Software applications are often developed using application components that may be shared across multiple application deployments. Some application components may be consumers of subordinate components, incorporating the features of the subordinate components. When producers of these subordinate components implement coding changes, the updated subordinate component may cause problems for consumer components if not tested thoroughly. Conventional systems can sometimes involve complex producer/consumer relationships, where a large number of systems are consumers of the producer's application. In such complex systems, it becomes nearly impossible for an application producer to create testing scenarios to adequately validate conditions for all interested consumers. Thus, in some cases a coding change to a producer's application may result in an unexpected failure in a consumer application. Embodiments discussed herein provide technical solutions to problems introduced by these types of application deployments.

BRIEF DESCRIPTION OF THE DRAWINGS

The embodiments described herein will be understood more fully from the detailed description given below and from the accompanying drawings. The drawings should not be taken to limit the application to the specific embodiments, but are for explanation and understanding only.

DETAILED DESCRIPTION

Embodiments described herein relate to providing a platform for managing contributed tests for a software deployment pipeline. In one embodiment, a contributed test manager can provide the ability for software developers from a consumer system to contribute tests to a producer system's software development pipeline. In some embodiments, the contributed tests can block the software release process for new code if the contributed tests indicate that the consumer system may experience a failure as a result of the producer's new code. Thus, interested consumers can provide testing scenarios to both improve the overall effectiveness of testing within the deployment pipeline as well as significantly reduce the number of unexpected failures in consumer applications as a result of changes to the producer's application code.

Conventional software deployment pipelines provide the pipeline owner with security access to add software tests into the pipeline. However, providing this access to interested consumers presents significant security concerns since conventional pipelines do not provide granularity in security access. Thus, conventional systems do not typically provide an interested consumer with the ability to add contributed tests to a pipeline without involving significant coordination with the producer system developers. In such cases, agreement on the contents of a test and the service level agreement (SLA) parameters for a contributed test may vary across consumers. Thus, negotiation between the parties can become a significant impediment to efficient pipeline management. In one embodiment, the contributed test manager of the present disclosure incorporates predefined SLA parameters that can be used to manage a contributed test. The SLA parameters can be encapsulated with the contributed test code provided by a interested consumer, thereby significantly reducing overhead involved in negotiating testing parameters and resulting in a more efficient deployment pipeline.

Figure 1:
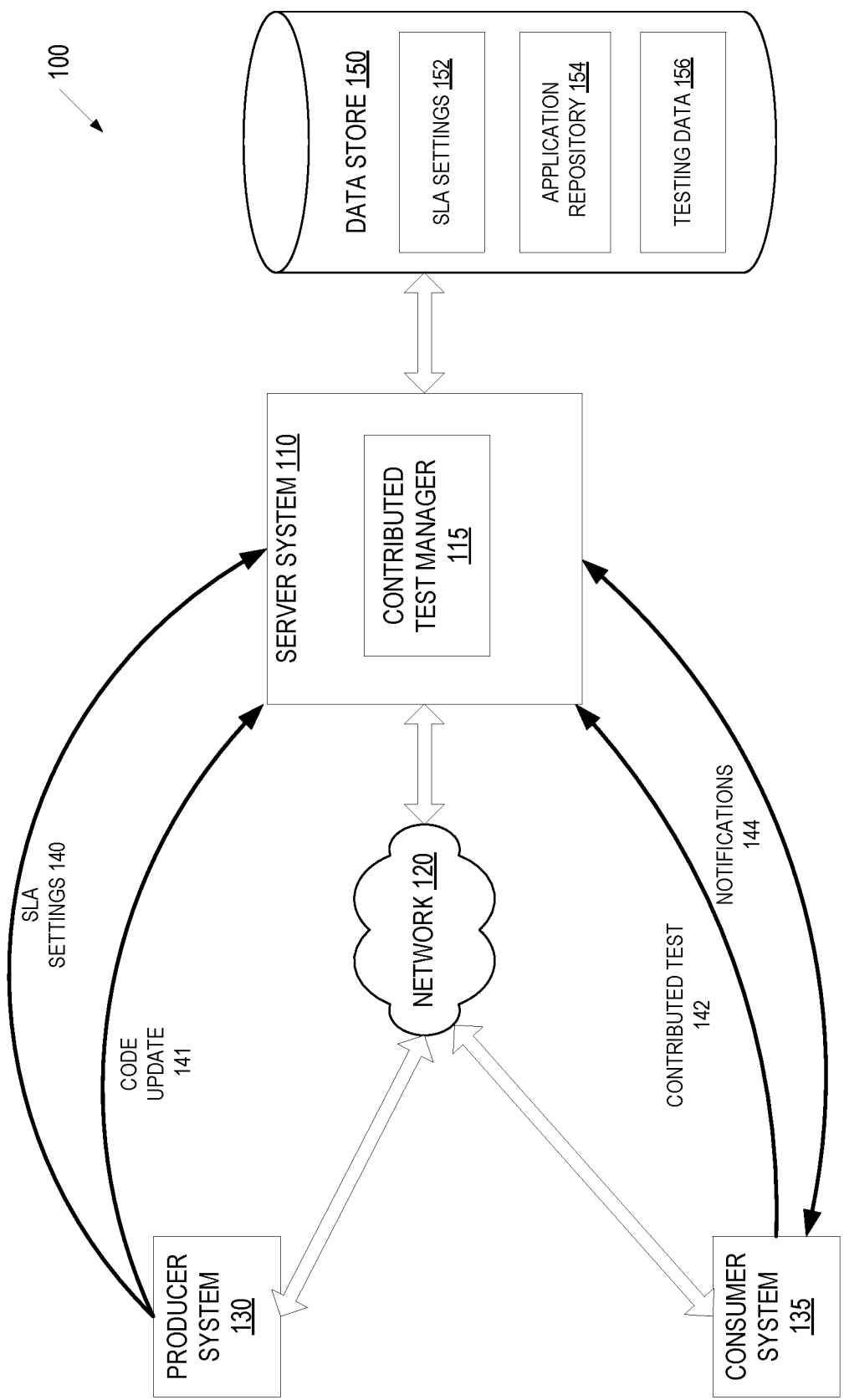
FIG. 1 is a block diagram of an example network architecture including an contributed test manager, in accordance with one embodiment.

FIG. 1 is a block diagram of an example network architecture 100 in which embodiments described herein may operate. In one embodiment, the network architecture 100 may include server system 110, a producer system 130, and a consumer system 135 capable of communicating via a network 120. In one embodiment, network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In one embodiment, the network 120 may have any suitable communication range associated therewith and may include, for example, public networks (e.g., the Internet), metropolitan area networks (MANs), wide area networks (WANs), local area networks (LANs), or personal area networks (PANs). In one embodiment, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In one embodiment, producer system 130 and/or consumer system 135 may include any type of mobile computing device (e.g., that has a finite power source) or traditionally non-portable computing device. In one embodiment, producer system 130 and/or consumer system 135 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. In one embodiment, producer system 130 and/or consumer system 135 may also be a traditionally non-portable computing device such as a desktop computer, a server computer, or the like. In one embodiment, producer system 130 and/or consumer system 135 may be configured with functionality to enable interaction with a contributed test manager, such as that provided by contributed test manager 115 of server system 110.

In one embodiment, producer system 130 and/or consumer system 130 may include access to an application development platform that can provide the ability to update and store application components (e.g., web application widgets, standalone software applications, etc.) within server system 110. In one embodiment, some application components may be consumers of subordinate components (e.g. producer components), incorporating the features of the subordinate components. In one embodiment, a producer system 130 may be the source of a subordinate component (e.g., the owner or producer of the subordinate component). In one embodiment, consumer system 135 may be the source of a consumer application component that incorporates the features of the subordinate component produced by producer system 130 (e.g., the component produced by consumer system 135 is a consumer of the component produced by producer system 130).

In one embodiment, producer system 130 may interact with contributed test manager 115 to enable consumers of producer system 130's application components (e.g., consumer system 135) to inject tests into producer system 130's software deployment pipeline. In one embodiment, producer system 130 may provide contributed test manager 115 with service level agreement (SLA) settings 140 that control contributed testing functionality, which should be accepted by any consumer system 135 that provides a contributed test 142 for the producer system 130's software deployment pipeline. In one embodiment, when producer system 130 submits code update 141 to the software deployment pipeline, contributed test manager 115 can invoke contributed test 142 to test the code update 141. In one embodiment, contributed test manager 115 may then communicate with consumer system 135 by sending notifications 144 based on the success or failure of contributed test 142 as described in further detail below.

Communication between the server system 120, producer system 130, and/or consumer system 135 may be enabled via any communication infrastructure, such as public and private networks. In one embodiment, an example of such an infrastructure includes a combination of a wide area network (WAN) and wireless infrastructure, which allows a user to use producer system 130 and/or consumer system 135 to interact with contact contributed test manager 115 without being tethered to the server system 110 via hardwired links. In one embodiment, the wireless infrastructure may be provided by one or multiple wireless communications systems. In one embodiment, the wireless communication systems may be a Wi-Fi access point connected with the network 120. In one embodiment, the wireless communication systems may be a wireless carrier system that can be implemented using various data processing equipment, communication towers, etc. In one embodiment, the wireless carrier system may rely on satellite technology to exchange information with producer system 130 and/or consumer system 135.

In one embodiment, server system 110 may be set up by an entity such as a company or a public sector organization to provide one or more services (such as various types of cloud-based computing or storage) accessible via the Internet and/or other networks to producer system 130 and/or consumer system 135. In one embodiment, server system 110 may include numerous data centers hosting various resource pools, such as collections of physical and/or virtualized computer servers, storage devices, networking equipment and the like, needed to implement and distribute the infrastructure and services offered by the server system 110, including to provide multi- and single-tenant services.

In one embodiment, server system 110 may implement a contributed test manager 115 and associated services, provide other computing resources or services, such as a virtual compute service and storage services, such as object storage services, block-based storage services, data warehouse storage service, archive storage service, data store 150, and/or any other type of network based services (which may include various other types of storage, processing, analysis, communication, event handling, visualization, and security services, such as a code execution service that executes code without client management of the execution resources and environment). In one embodiment, producer system 130 and/or consumer system 135 may access these various services offered by server system 110 via network 120, for example through an application programming interface (API) or a command line interface (CLI) Likewise network-based services may themselves communicate and/or make use of one another to provide different services.

As noted above, in one embodiment, server system 110 may include a contributed test manager 115 which can facilitate the management of contributed tests for application components (e.g., tests that are contributed by parties other than the owners of the application component being tested). In one embodiment, an application component may be made up of application source code to generate an executable bundle that executes within a web browser (e.g., web component, widget, custom elements, etc.). In one embodiment, an application component may be made up of application source code to generate an executable bundle that executes as a standalone application outside of a web browser. In one embodiment, application component may be made up of one or more elements including JavaScript, cascading style sheets (CSS), hypertext markup language (HTML), or any similar markup language or application development source code. In one embodiment a test may be made up of a set of instructions that test different functionalities of an application component when a code update (e.g., code update 141) is made to that application component.

In one embodiment, contributed test manager 115 may facilitate the management of contributed tests by utilizing stored service level agreement (SLA) settings that are associated with parameters of contributed test capabilities within a software deployment pipeline. In one embodiment, an SLA setting may be a maximum run time value for a contributed test. Thus, a contributed test may violate the SLA setting if the run time of the contributed test exceeds the maximum run time value. In one embodiment, the SLA setting may be a maximum response time value for a test contributor to respond to any problems with the test. In one embodiment, the SLA setting may include the parameters that control a transfer of ownership of the test from the consumer (e.g., the current test owner) to the producer (e.g., the owner of the application component). Once the SLA settings provided by the producer system 130 have been accepted, a contributed test may be submitted for execution in the deployment pipeline for producer system 130.

In one embodiment, server system 110 may provide contributed test manager 115 with access to data store 150 that stores SLA settings 152, application repository 154, and testing data 156. In one embodiment, SLA settings 152 may include a data structure that stores the SLA settings associated with attributes of the testing capabilities for the deployment pipeline. In one embodiment, SLA settings 152 may be stored as a database, a list, a tree structure, or in any similar manner. In one embodiment, when contributed test manager 115 receives a request to enable contributed testing capability in the deployment pipeline, the SLA settings for the pipeline may also be received and stored in SLA settings 152.

In one embodiment, application repository 154 may be a data structure for storing the source code elements of a new or updated application component. Application repository 154 may be structured as a database, as a component of a source code management tracking system, or the like. In one embodiment, application repository 154 additionally stores contributed test instructions (e.g., code, scripts, etc.) for execution within the deployment pipeline when producer system 130 provides code updates (e.g., code update 141) to the deployment pipeline. In one embodiment, testing data 156 may be a data structure that maintains historical results of testing cycles. Thus, in one embodiment, some SLA thresholds that may depend on historical efficacy of tests may be monitored over time using testing data 156.

In one embodiment, contributed test manager 115 may receive a request from producer system 130 to enable contributed test capability in a software deployment pipeline. In one embodiment, contributed test manager 115 may then receive a service level agreement (SLA) setting from producer system 130, where the SLA setting is associated with a parameter of the contributed test capability, and subsequently store the SLA setting in SLA settings 152. In one embodiment, contributed test manager 115 may subsequently receive a request from consumer system 135 for a contributed software test to be added to the deployment pipeline of producer system 130. In one embodiment, contributed test manager 115 may subsequently receive a notification from consumer system 135 to indicate that consumer system 135 has accepted the SLA setting for the contributed test, thereby confirming that the consumer system 135 has agreed to the SLA setting parameters for any contributed test.

In one embodiment, contributed test manager 115 receives a code update from producer system 130 to be added to the development pipeline, and causes the contributed test to test the code update in the deployment pipeline. In one embodiment, contributed test manager 115 then monitors the contributed test based on the SLA settings for the deployment pipeline and takes action if the test fails during execution (e.g., by producing unexpected results, violating a maximum run time SLA setting for the test, or the like). Contributed test manager 115 is described in further detail below with respect FIG. 2.

Figure 2:
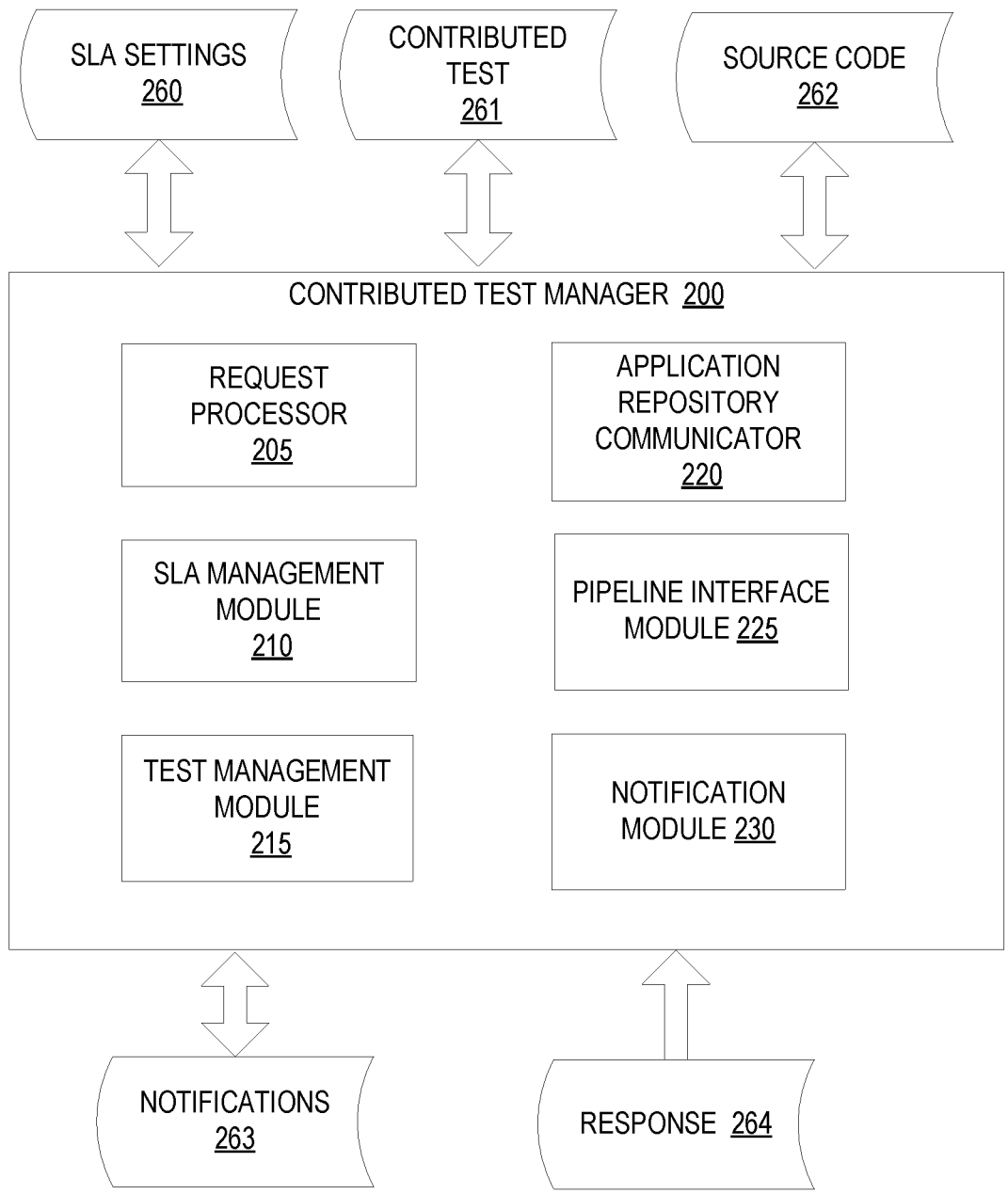
FIG. 2 is a block diagram of a logical view of a contributed test manager, in accordance with one embodiment.

FIG. 2 is a block diagram of a logical view of a contributed test manager 200, in accordance with one embodiment. In one embodiment, contributed test manager 200 may correspond to the contributed test manager 115 of FIG. 1. In one embodiment, contributed test manager 200 may include request processor 205, SLA management module 210, test management module 215, application repository communicator 220, pipeline interface module 225, and notification module 230.

In one embodiment, request processor 205 can receive a request from a producer system to enable contributed test capability in a deployment pipeline. In one embodiment, the producer system owns or otherwise manages a software application component that is used by (e.g., accessed by, incorporated in, etc.) a separate application component of a consumer system (e.g., consumer system 135 of FIG. 1). In one embodiment, the request may enable contributed test capability for a particular application component in the deployment pipeline. In one embodiment, the request may enable contributed test capability for any application component in the deployment pipeline. In one embodiment the request may be received from a graphical user interface executing on the producer system that provides management capability for the deployment pipeline. In one embodiment, request processor 205 can subsequently receive a service level agreement (SLA) setting (SLA settings 260) from the producer system (e.g., from the graphical user interface for the deployment pipeline). In one embodiment, an SLA setting may be associated with a parameter of contributed test capabilities within the software deployment pipeline. In one embodiment, a single SLA setting may be received. In another embodiment, multiple SLA settings may be received for different parameters.

As noted above with respect to FIG. 1, in one embodiment, an SLA setting may be a maximum run time value for a contributed test. Thus, a contributed test may violate the SLA setting if the run time of the contributed test exceeds the maximum run time value. In one embodiment, the SLA setting may be a maximum response time value for a test contributor to respond to any problems with the test. In one embodiment, the SLA setting may include the parameters that control a transfer of ownership of the test from the consumer (e.g., the test owner) to the producer (e.g., application component code owner/provider). In one embodiment, SLA management module 210 may be invoked to store the received SLA settings associated with the deployment pipeline.

In one embodiment, request processor 205 may then receive a request from the consumer system for a software test (e.g., contributed test 261) to be added to the deployment pipeline. In one embodiment, the software test is contributed by the consumer system (e.g., a contributed test) to test a particular application component that is owned by the producer system. Thus, in one embodiment, if the producer system submits a code update for that particular application component, the contributed test 261 may be executed to test that code update. In one embodiment, the request may be received from a graphical user interface for the deployment pipeline that is executed by the consumer system. In one embodiment, SLA management module 210 may be invoked to identify any SLA settings that are associated with that application component in the deployment pipeline and provide the identified SLA settings to the consumer system for display in a user interface (e.g., the graphical user interface for the deployment pipeline). In one embodiment, SLA management module 210 may receive a notification from the consumer system to indicate that the consumer system has accepted the SLA setting (or settings) for the contributed test. In one embodiment, SLA management module 210 may receive a notification from the consumer system to indicate that the consumer system has requested an exception or override for the SLA settings for the contributed test. For example, in one embodiment, the consumer system may request additional time for an maximum run time SLA setting. Similarly, the consumer system may request additional time for a maximum response time SLA setting. In one embodiment, application repository communicator 220 may be invoked to store the contributed test in an application repository, along with a reference to the accepted (or overridden) SLA settings for the contributed test.

In one embodiment, request processor 205 may subsequently receive a request from the producer system that includes a code update to be added to the deployment pipeline. The request may include updated source code 262 for an application component owned by the producer system that is accessed by the consumer system. In one embodiment, the code update may be for an application component that is associated with a contributed test 261 that was previously received from a consumer system. In one embodiment, application repository communicator 220 may be invoked to store the code update in the application repository.

Subsequently, in one embodiment, pipeline interface module 225 may be invoked to cause the contributed test to test the code update in the deployment pipeline. In one embodiment, the deployment pipeline includes multiple tests—some owned by the producer system (the owner of the code update), and others owned by other systems (e.g., the consumer system, for example). In one embodiment, test management module 215 may communicate with the pipeline interface module 225 to monitor the progress of tests within the deployment pipeline, and manage any error conditions that may occur. In one embodiment, a contributed test may be designed to return a result that indicates whether the test passed or failed. For example, in one embodiment, a contributed test may be constructed so that if it functions as expected, it may return a result that indicates a "pass" condition. Similarly, in one embodiment, a contributed test may be constructed so that if it does not function as expected, it may return a result that indicates a "fail" condition.

In one embodiment, while monitoring the deployment pipeline, test management module 215 may determine whether the contributed test fails during execution. In one embodiment, the contributed test may fail if it produces unexpected results as noted above. In one embodiment the contributed test may fail if it violates one of the SLA settings for the deployment pipeline. If the contributed test does fail, pipeline interface module 225 may be invoked to pause deployment of the code update for the application component being tested within the pipeline until a determination may be made regarding the cause of the test failure. In one embodiment, pipeline interface module 225 may then disable the contributed test within the deployment pipeline to prevent it from automatically re-executing. In one embodiment, notification module 230 may be invoked to indicate to the consumer system that the contributed test has failed during execution. In one embodiment, a notification may be sent to the consumer system with this information as well as contextual information to describe the test failure. For example, the notification may include the step in the test that was executing at the time of the violation, the SLA setting that was violated (e.g., the length of time the test executed), any data element that was being processed by the test, or the like.

In one embodiment, as noted above, an SLA setting may be a maximum run time value for the contributed test. In one embodiment, test management module 215 may determine that the contributed test has failed during execution because it violated this SLA setting by setting a timer that expires at the end of the maximum run time value, and subsequently determining that the timer has expired while the contributed test is still executing. In another embodiment, test management module 215 may detect a failure of the contributed test during its execution by detecting an abnormal termination of the contributed test, an unexpected error message produced by the contributed test, a test that returns a result that indicates a "fail" condition, or the like.

In some embodiments, when a failure has been detected, test management module 215 may send a notification 263 to the consumer system to indicate that a failure has occurred, and await a response 264 from the consumer system to indicate what additional actions should be taken. In one embodiment, test management module 215 starts a timer that expires at the end of a maximum response time value. In some embodiments, the maximum response time value may be an additional SLA setting for the deployment pipeline. In one embodiment, a notification (response 264) may be received from the consumer system to indicate that the failure of the contributed test relates to the code update (e.g., a bug in the code update has been detected by the contributed test). In such cases, test management module 215 may invoke pipeline interface module 225 to re-enable the contributed test within the deployment pipeline and stage the contributed date for re-execution within the deployment pipeline. In some embodiments, deployment of the code update for the producer application component within the deployment pipeline may be paused or postponed until the code update for the producer application component is analyzed and corrected. In one embodiment, a notification 263 may be sent to the producer system indicating that the failure of the contributed test relates to the code update so that the code update may be examined for defects.

In one embodiment, a notification (response 264) may be received from the consumer system before the expiration of the timer to indicate that the failure of the contributed test relates to the contents of the contributed test (e.g., a bug in the contributed test instructions). In such cases, a correction to the contributed test may be submitted before the expiration of the timer. In one embodiment, another request may be received before the expiration of the timer that includes a correction to the contributed test. In such cases, test management module 215 may invoke pipeline interface module 225 to re-enable the contributed test within the deployment pipeline and stage the contributed test for re-execution within the deployment pipeline.

In some embodiments, test management module 215 may determine that the contributed test re-executes successfully. In such cases, test management module 215 may access historical information for the deployment pipeline to determine whether the ownership of the contributed test may be transferred from the consumer system to the producer system. Notably, a transfer of ownership could permanently incorporate the contributed test into the deployment pipeline to be managed by the producer system. In one embodiment, test management module 215 receives historical data for the contributed test that includes a total number of successful executions of the contributed test during previous test executions.

In one embodiment, test management module 215 then determines whether the total number of successful executions of the contributed test meets a success threshold. In some embodiments the success threshold may be an additional SLA setting for the deployment pipeline. If the total number of successful executions does meet the SLA success threshold, test management module 215 may invoke application repository communicator 220 to update an ownership attribute for the contributed test to indicate that the ownership of the contributed test has been transferred from the consumer system to the producer system. In one embodiment, test management module may then invoke notification module 230 to indicate to the consumer system (e.g., by sending notification 263 to the consumer system) that ownership of the contributed test has been transferred from the consumer system to the producer system.

In one embodiment, test management module 215 may determine that the maximum response time value timer has expired before a response is received from the consumer system to indicate the reason for the failure of the first test.

In one embodiment, test management module 215 may send a notification to the producer system to indicate that deployment of the code update for the application component being tested is to be reviewed prior to deployment within the deployment pipeline. Thus, a producer may determine whether the failure of the consumer to provide a response should delay the deployment of the code update for the application component within the deployment pipeline.

In one embodiment, test management module 215 may access historical information for the deployment pipeline to determine the effectiveness of the contributed test. In one embodiment, test management module 215 may receive historical data for the contributed test, where the historical data includes a total number of failures of the contributed test during previous test executions. In one embodiment, test management module 215 may then determine whether the total number of failures of the contributed test meets a failure threshold. In some embodiments the failure threshold may be an additional SLA setting for the deployment pipeline. If the total number of failures does meet the SLA failure threshold, test management module 215 may invoke notification module 230 to indicate to the consumer system (e.g., by sending notification 263 to the consumer system) that the contributed test has violated the failure threshold. In other words, the contributed test has failed too many times to continue to be automatically executed within the deployment pipeline. In some embodiments, the contributed test may need modification before being resubmitted to the deployment pipeline.

FIGS. 3-6 are flow diagrams of various embodiments of methods performed by a contributed test manager to manage contributed tests for a deployment pipeline. The methods are performed by processing logic that may include hardware (circuitry, dedicated logic, etc.), software (such as is run on a general purpose computer system or a dedicated machine), firmware, or some combination thereof. In one embodiment, the methods may be performed by contributed test manager 115 of FIG. 1, and/or contributed test manager 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
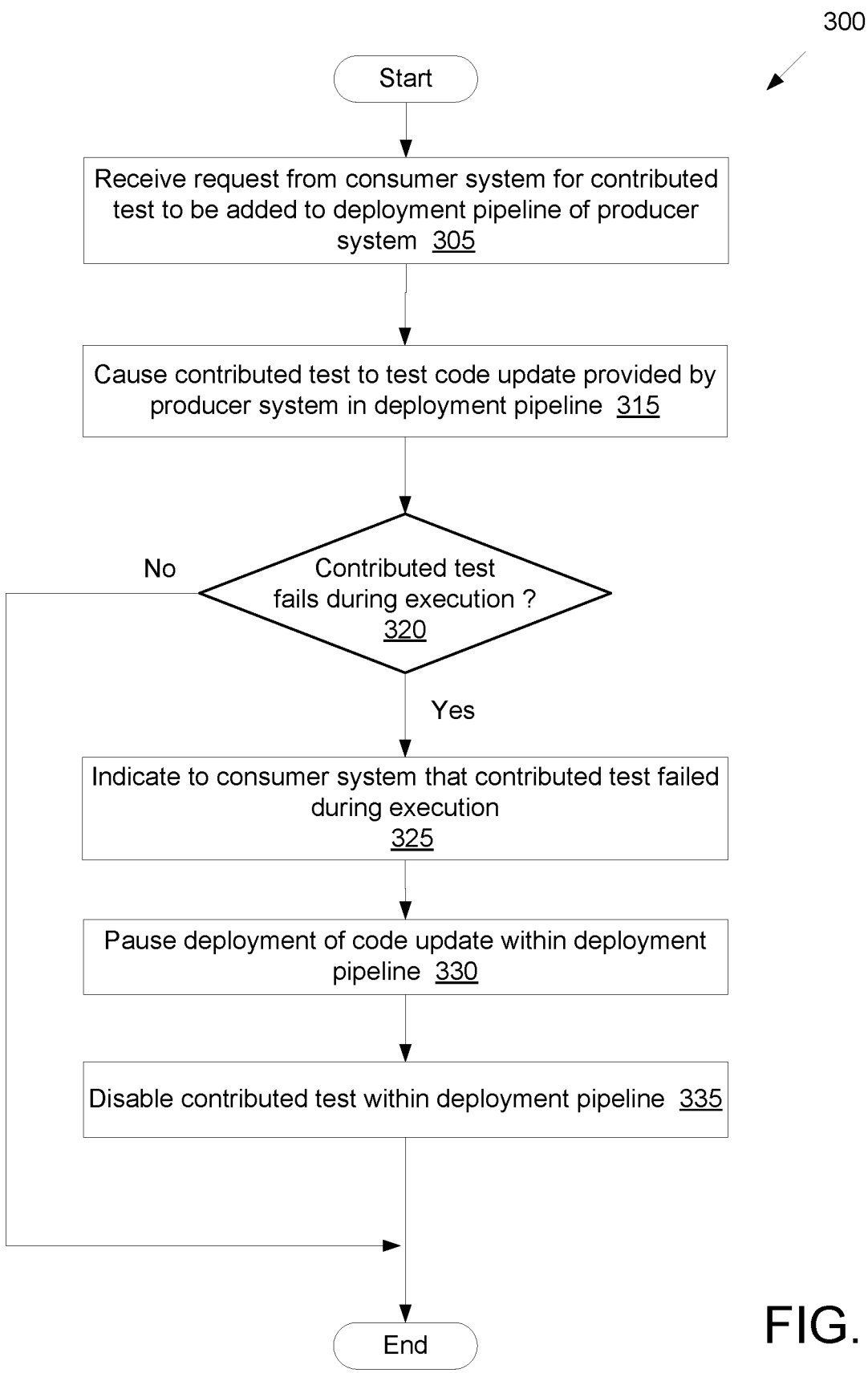
FIG. 3 is a flow diagram of an embodiment for a method of managing contributed tests for a software deployment pipeline, in accordance with one embodiment.

FIG. 3 is a flow diagram of an embodiment for a method 300 of managing contributed tests for a software deployment pipeline. At block 305 of method 300, processing logic receives a request for a contributed software test to be added to a software deployment pipeline. In one embodiment, the request is received from a consumer system that accesses a software application component of a producer system. In one embodiment, the contributed software test is to test the software application component of the producer system within the producer system's deployment pipeline.

At block 315, processing logic causes the contributed test to test a code update for the producer application component in the deployment pipeline. At block 320, processing logic determines whether the contributed test failed during execution. In one embodiment, this determination is made based on whether the contributed test violates an SLA maximum run time setting accepted by the consumer system as described below with respect to FIG. 4. In one embodiment, this determination is made based on whether the contributed software test returns unexpected results. If the test has not failed, the method of FIG. 3 terminates. If the test has failed during execution, processing logic proceeds to block 325. At block 325, processing logic indicates to the consumer system that the contributed software test failed during execution. At block 330, processing logic pauses deployment of the code update for the producer application component within the deployment pipeline. At block 335, processing logic disables the contributed software test within the deployment pipeline. After block 335 the method of FIG. 3 terminates.

Figure 4:
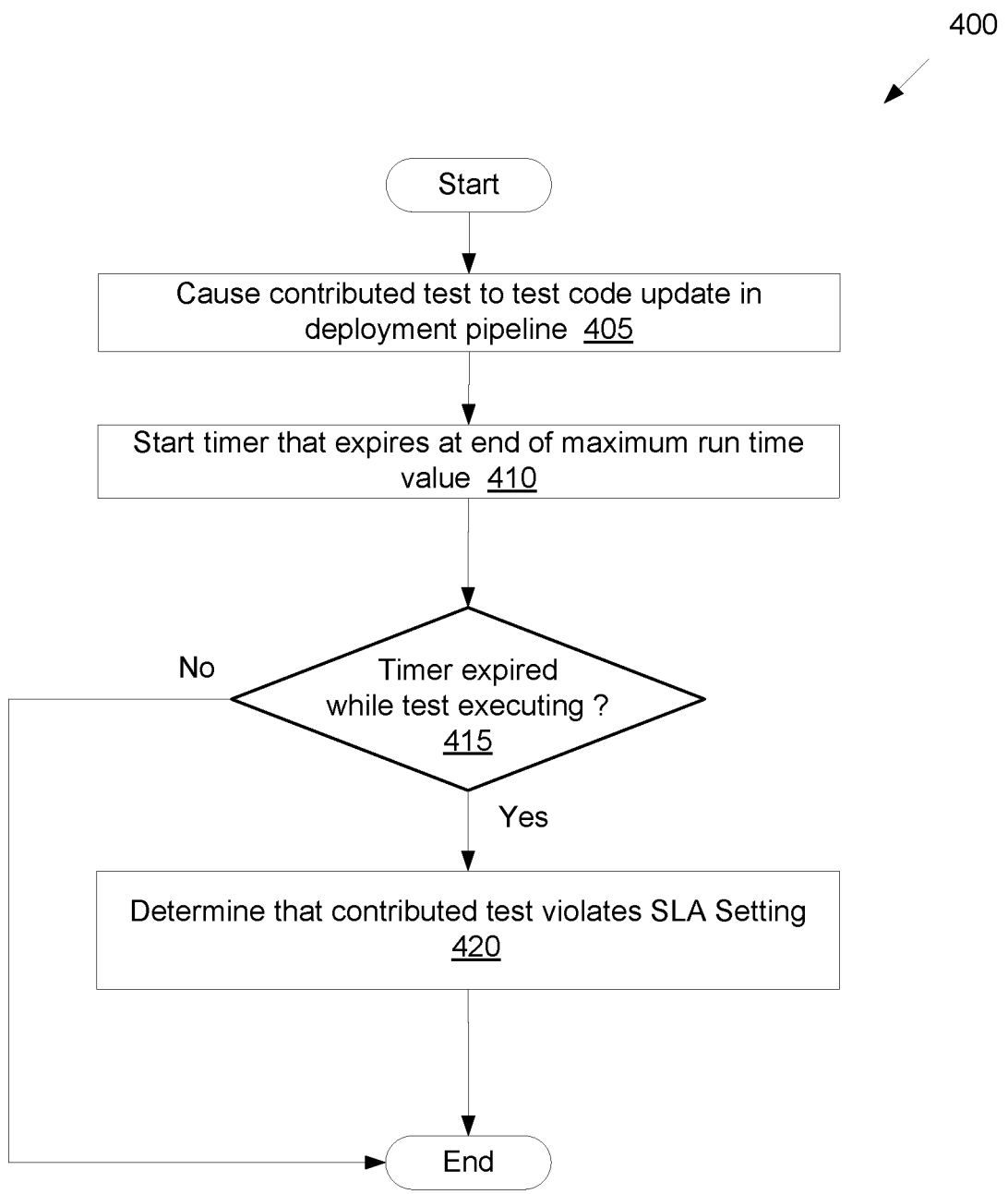
FIG. 4 is a flow diagram of an embodiment for a method of determining whether a contributed test violates an SLA setting for a deployment pipeline, in accordance with one embodiment.

FIG. 4 is a flow diagram of an embodiment for a method 400 of determining whether a contributed test violates an SLA setting for a deployment pipeline. At block 405 of method 400, processing logic causes a contributed test to test a code update for a producer application component in the deployment pipeline. At block 410, processing logic starts a timer that expires at the end of a maximum run time value. In one embodiment, the maximum run time value may be an SLA setting for the development pipeline. At block 415, processing logic determines whether the timer has expired while the contributed test is executing. If not, the method of FIG. 4 terminates. Otherwise, processing continues to block 420. At block 420, processing logic determines that the contributed test violates the SLA setting. After block 420 the method of FIG. 4 terminates.

Figure 5:
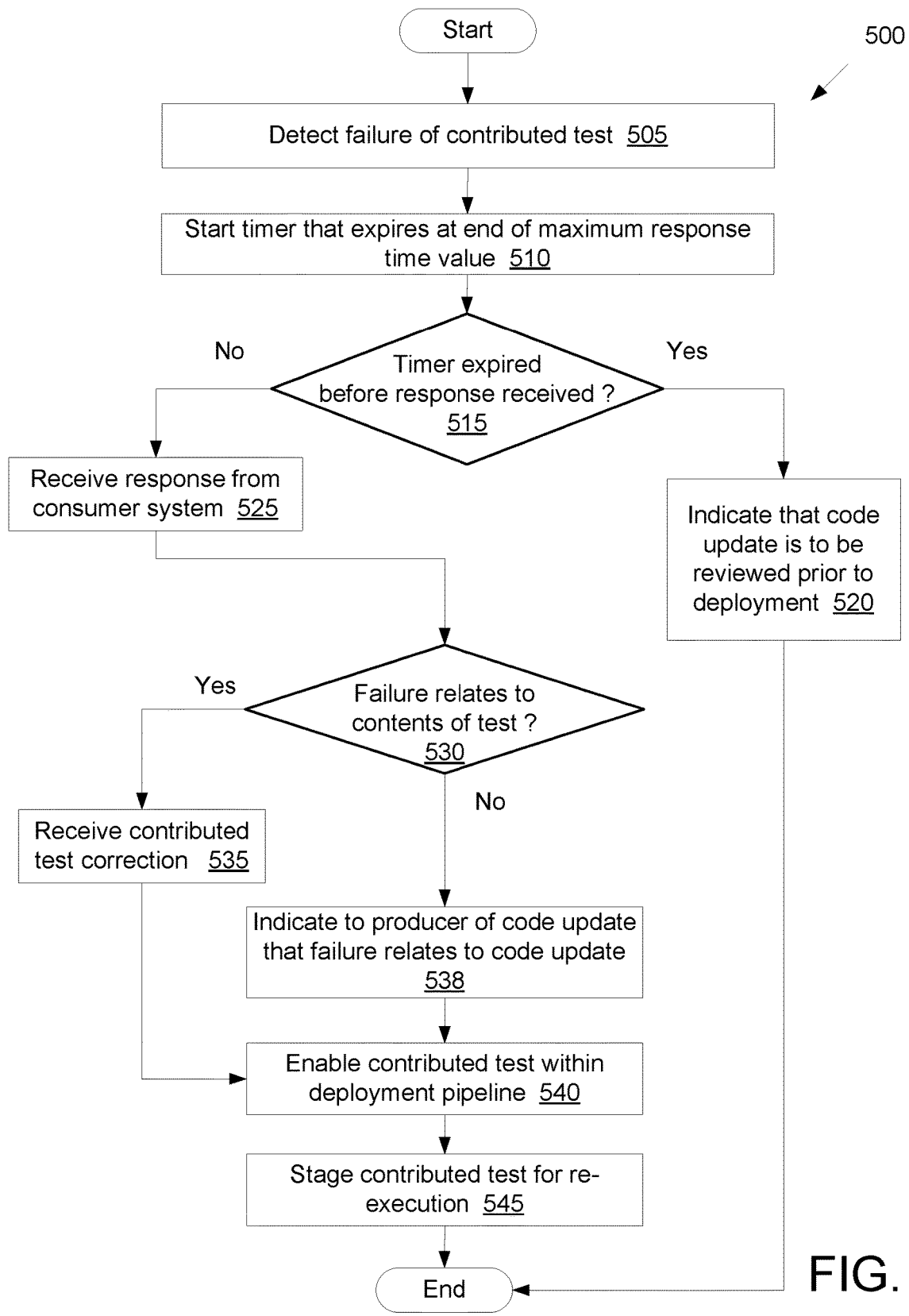
FIG. 5 is a flow diagram of an embodiment for a method of managing a failure of a contributed test, in accordance with one embodiment

FIG. 5 is a flow diagram of an embodiment for a method 500 of managing a failure of a contributed test. At block 505 of method 500, processing logic detects a failure of a contributed test within a deployment pipeline. At block 510, processing logic starts a timer that expires at the end of a maximum response time value. At block 515, processing logic determines whether the timer has expired before a response is received from a consumer system associated with the contributed test. If so, processing proceeds to block 520, where processing logic indicates that the code update is to be reviewed prior to deployment within the deployment pipeline. After block 520 the method of FIG. 5 terminates.

If at block 515, processing logic determines that the timer has not expired before a response is received, processing proceeds to block 525 where a response is received from a consumer system that indicates the cause of the test failure. At block 530, processing logic branches based on the cause of the failure included in the response received at block 525. If the failure is related to the contents of the test, processing proceeds to block 535 where processing logic receives a contributed test correction. Processing then continues to block 540.

If at block 530, processing logic determines that the failure does not relate to the contents of the test (e.g., the failure relates to the code update being tested), processing continues to block 538 where processing logic indicates to the producer of the code update that the failure relates to the code update. At block 540, processing logic enables the contributed test within the deployment pipeline. At block 545, processing logic stages the contributed test for re-execution within the deployment pipeline. After block 545 the method of FIG. 5 terminates.

Figure 6:
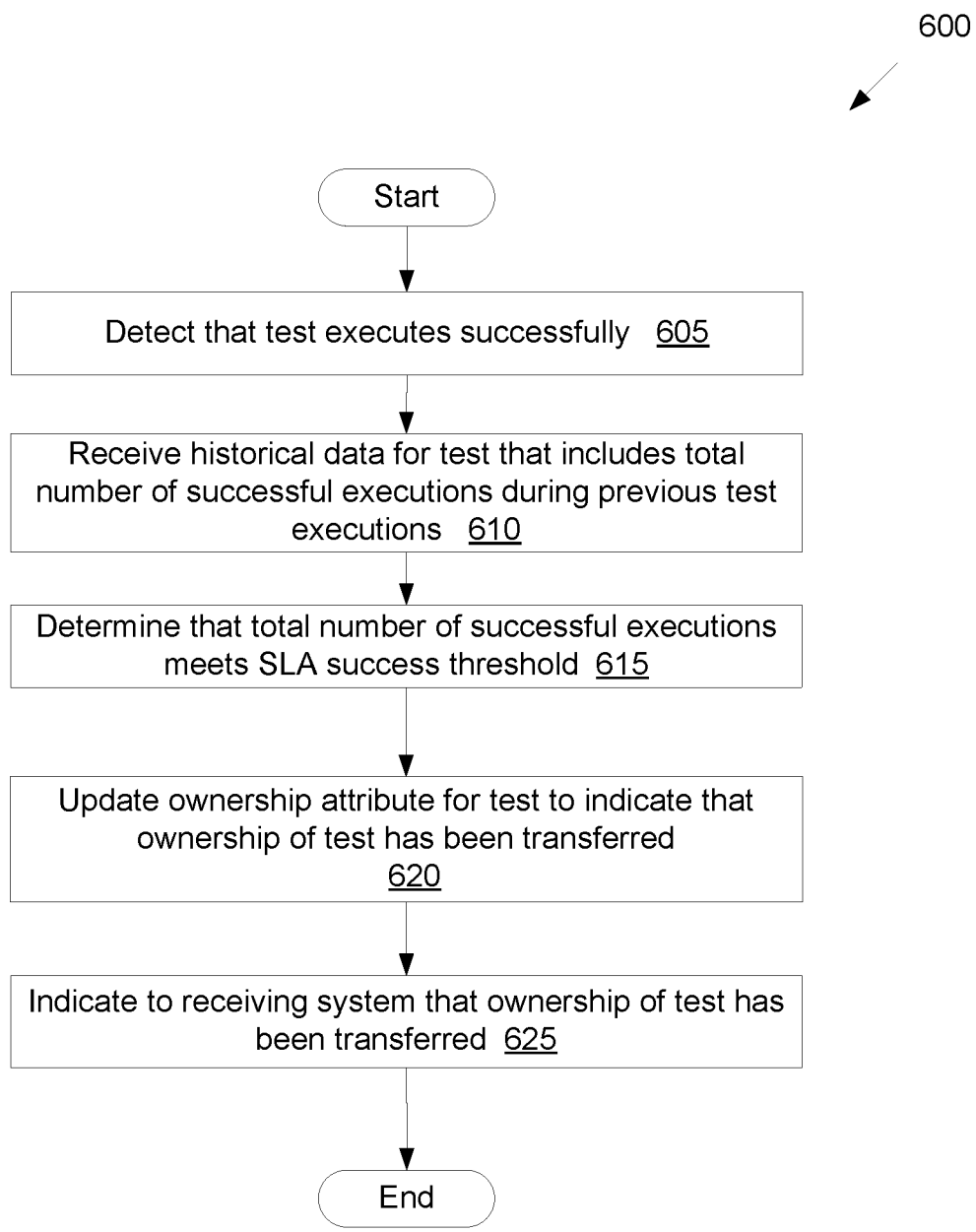
FIG. 6 is a flow diagram of an embodiment for a method of transferring ownership of a contributed test, in accordance with one embodiment

FIG. 6 is a flow diagram of an embodiment for a method 600 of transferring ownership of a contributed test. At block 605 of method 600, processing logic detects that a contributed test has executed successfully. In one embodiment, processing logic makes this determination after a consumer system has submitted a corrected contributed test after a test failure as described above with respect to FIG. 5. At block 610, processing logic receives historical data for the contributed test that includes a total number of successful executions during previous test executions within the deployment pipeline.

At block 615, processing logic determines that the total number of successful executions meets an SLA success threshold. At block 620, processing logic updates an ownership attribute for the contributed test to indicate that the ownership of the contributed test has been transferred. In one embodiment, the ownership of the contributed test may be transferred from the current owner of the test (e.g., the test contributor/application consumer system) to the owner of the software application component being tested (e.g., the application producer system). At block 625, processing logic indicates to a receiving system that the ownership of the contributed test has been transferred. In one embodiment, the receiving system may be the consumer system from which the ownership was transferred. In another embodiment, the receiving system may be the producer system to which the ownership was transferred. After block 625 the method of FIG. 6 terminates.

Figure 7:
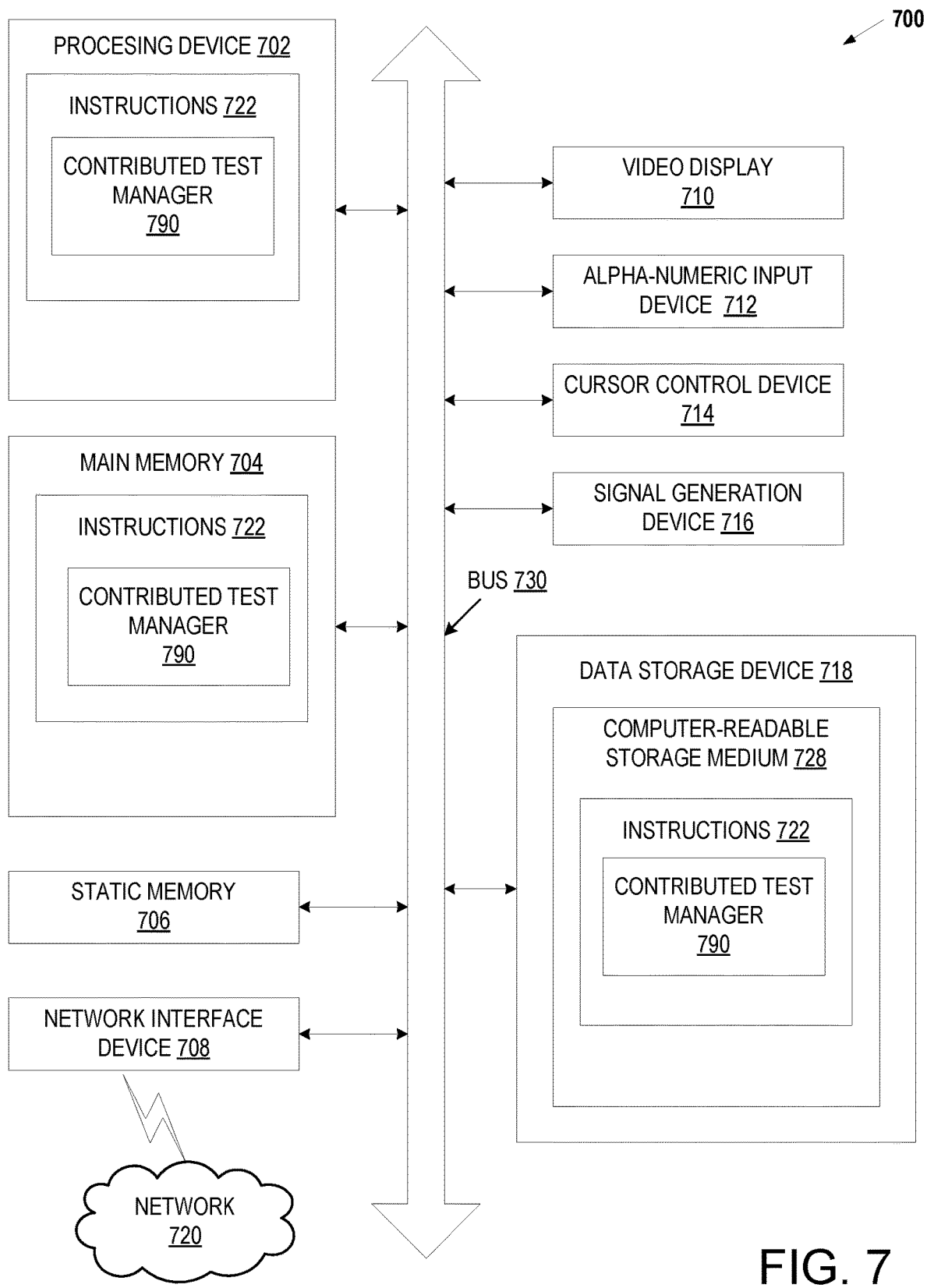
FIG. 7 is a block diagram illustrating a server computing device with an asynchronous dependency resolver, in accordance with one embodiment.

FIG. 7 is a block diagram illustrating a computing device 700 with an contributed test manager 790, in accordance with one embodiment. In one embodiment, the server computing device 700 may be connected (e.g., networked) to other machines in a LAN, an intranet, an extranet, and/or the Internet. In one embodiment, the server computing device 700 may be a personal computer (PC), a tablet PC, a set-top box (STB), a web appliance, a rackmount server, a network router, a switch or bridge, or any machine capable of executing a set of instructions (sequential or otherwise) that specify actions to be taken by that machine. Further, while a single machine is illustrated, in one embodiment the server computing device 700 shall also be taken to include any collection of machines that individually or jointly execute a set (or multiple sets) of instructions to perform any one or more of the methodologies discussed herein. For example, the server computing device 700 may be one or more devices in a server system. In one embodiment, the server computing device 700 is one node of a cluster that provides a cloud service such as Amazon's® elastic compute cloud (EC2®), Amazon web services (AWS®), or other cloud service.

In one embodiment, the server computing device 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage component 718, which communicate with each other via a bus 730.

In one embodiment, processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. In one embodiment, processing device 702 may also be one or more special-purpose processing devices such as an application specific integrated circuit (ASIC), a field programmable gate array (FPGA), a digital signal processor (DSP), network processor, or the like. In one embodiment, the processing device 702 is configured to execute instructions 722 for performing the operations and steps discussed herein.

In one embodiment, the server computing device 700 may further include a network interface device 708. In one embodiment, the server computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and/or a signal generation device 716 (e.g., a speaker).

In one embodiment, the data storage component 718 may include a machine-readable storage medium 728 (also known as a computer-readable medium) on which is stored one or more sets of instructions or software 722 embodying any one or more of the methodologies or functions described herein. In one embodiment, the instructions 722 may also reside, completely or at least partially, within the main memory 704 and/or within the processing device 702 during execution thereof by the server computing device 700, the main memory 704 and the processing device 702 also constituting machine-readable storage media.

In one embodiment, the instructions 722 include instructions for a contributed test manager 790 (e.g., contributed test manager 115 of FIG. 1, and/or contributed test manager 200 of FIG. 2) and/or a software library containing methods that call modules in an contact run-time engine (e.g., corresponding to the methods of FIGS. 3-6, etc.). In one embodiment, while the machine-readable storage medium 728 is shown to be a single medium, the term "machine-readable storage medium" should be taken to include a single medium or multiple media (e.g., network attached storage, a centralized or distributed database, and/or associated unsolicited content storage areas and servers) that store the one or more sets of instructions. In one embodiment, the term "machine-readable storage medium" shall also be taken to include any medium other than a carrier wave that is capable of storing or encoding a set of instructions for execution by the machine and that cause the machine to perform any one or more of the methodologies of the present disclosure. In one embodiment, the term "machine-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "providing", "determining", "causing", "disabling", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a first request from a producer system of an application component to enable contributed test capability for the application component in a deployment pipeline of the producer system;
receiving a second request from a consumer system of the application component, wherein the second request comprises a request for a first contributed test to be added to the deployment pipeline, wherein the first contributed test is associated with the application component, wherein the first contributed test is associated with a service level agreement (SLA) setting for an SLA, wherein the SLA controls functionality of the first contributed test, and wherein the SLA setting comprises a maximum run time value for the first contributed test;
receiving, from the producer system, a code update for the application component to be added to the deployment pipeline;
causing the first contributed test to test the code update in the deployment pipeline;
determining that the maximum run time value has been exceeded for the first contributed test during execution of the first contributed test;
determining that a failure of the first contributed test to complete before the maximum run time value has been exceeded causes the first contributed test to fail during the execution of the first contributed test;
starting a timer that expires at an end of a maximum response time value;
determining that the timer has expired before a response is received that indicates a reason for failure of the first contributed test;
indicating that deployment of the code update for the application component is to be reviewed prior to deployment within the deployment pipeline;
determining that a total number of failures of the first contributed test during previous executions causes the first contributed test to violate an SLA failure threshold;
disabling the first contributed test responsive to determining that the SLA failure threshold has been violated; and
indicating to at least one of the consumer system or the producer system that the first contributed test has violated the SLA failure threshold.

2. The method of claim 1, wherein the SLA setting is associated with a corresponding parameter of the contributed test capability, the method further comprising:
storing the SLA setting associated with the deployment pipeline;
providing the SLA setting to the consumer system for display in a user interface;
receiving a notification to indicate that the consumer system has accepted the SLA setting for the first contributed test; and
performing at least one of pausing deployment of the code update for the application component within the deployment pipeline or indicating to the consumer system that the first contributed test has failed.

3. The method of claim 1, further comprising:
indicating to the consumer system that the first contributed test has failed;
receiving a response from the consumer system to indicate that the failure of the first contributed test relates to the code update;
indicating to the producer system that the failure of the first contributed test relates to the code update;
enabling the first contributed test within the deployment pipeline; and
staging the first contributed test for re-execution within the deployment pipeline.

4. A method comprising:
receiving a first request from a consumer system, wherein the first request comprises a request for a first contributed test to be added to a deployment pipeline for an application component of a producer system, wherein the first contributed test is a test for the application component in the deployment pipeline, wherein the first contributed test is associated with a service level agreement (SLA) setting for an SLA, wherein the SLA controls functionality of the first contributed test, and wherein the SLA setting comprises a maximum run time value for the first contributed test;

causing the first contributed test to test a code update provided by the producer system for the application component in the deployment pipeline;

determining that the maximum run time value has been exceeded for the first contributed test during execution of the first contributed test;

determining that failure of the first contributed test to complete before the maximum run time value has been exceeded causes the first contributed test to fail during the execution of the first contributed test;

determining that a total number of failures of the first contributed test during previous executions causes the first contributed test to violate an SLA failure threshold;

disabling the first contributed test responsive to determining that the SLA failure threshold has been violated; and indicating to at least one of the consumer system or the producer system that the first contributed test has violated the SLA failure threshold.

5. The method of claim 4 further comprising:

receiving a second request from the producer system to enable contributed test capability for the application component in the deployment pipeline.

6. The method of claim 4, wherein the first contributed test encapsulates the SLA setting, the method further comprising:

storing the SLA setting associated with the deployment pipeline; and receiving a notification to indicate that the consumer system has accepted the SLA setting for the first contributed test.

7. The method of claim 4 further comprising:

receiving, from the producer system, the code update for the application component to be added to the deployment pipeline;

receiving, from the producer system, a second test for the application component, wherein the second test is controlled by the producer system; and causing the second test to test the code update provided by the producer system for the application component in the deployment pipeline.

8. The method of claim 4 further comprising:

pausing deployment of the code update for the application component within the deployment pipeline.

9. The method of claim 4, further comprising:

starting a timer that expires at an end of the maximum run time value; and determining that the timer has expired while the first contributed test is still executing.

10. The method of claim 4, further comprising:

indicating to the consumer system that the first contributed test has failed during execution;

receiving a notification from the consumer system to indicate that the failure of the first contributed test relates to the code update;

indicating to the producer system that the failure of the first contributed test relates to the code update;

enabling the first contributed test within the deployment pipeline; and staging the first contributed test for re-execution within the deployment pipeline.

11. The method of claim 4, further comprising:

starting a timer that expires at an end of a maximum response time value;

determining that the timer has expired before a response is received that indicates a reason for the failure of the first contributed test; and indicating that deployment of the code update for the application component is to be reviewed prior to deployment within the deployment pipeline.

12. The method of claim 4, further comprising:

receiving historical data for the first contributed test, wherein the historical data comprises the total number of failures of the first contributed test during the previous executions.

13. The method of claim 4, further comprising:

starting a timer that expires at an end of a maximum response time value;

receiving a notification before expiration of the timer to indicate that the failure of the first contributed test relates to contents of the first contributed test;

receiving a second request before the expiration of the timer that comprises a correction for the first contributed test;

enabling the first contributed test within the deployment pipeline; and staging the first contributed test for re-execution within the deployment pipeline.

14. A system comprising:

a processing device; and memory to store computer-executable instructions that, if executed, cause the processing device to:

receive a first request from a consumer system, wherein the first request comprises a first contributed test to be added to a deployment pipeline of a producer system, wherein the first contributed test is associated with an application component in the deployment pipeline, wherein a service level agreement (SLA) controls functionality of the first contributed test, the SLA comprising an SLA setting that comprises a maximum run time value for the first contributed test;

cause the first contributed test to test a code update provided by the producer system for the application component in the deployment pipeline;

determine that the maximum run time value has been exceeded for the first contributed test during execution of the first contributed test;

determine that failure of the first contributed test to complete before the maximum run time value has been exceeded causes the first contributed test to fail during the execution of the first contributed test;

start a timer that expires at an end of a maximum response time value;

receive a notification from the consumer system before expiration of the timer that indicates that the failure of the first contributed test relates to contents of the first contributed test;

receive a second request that comprises a correction for the first contributed test;

enable the first contributed test within the deployment pipeline; and stage the first contributed test for re-execution within the deployment pipeline.

15. The system of claim 14, wherein the processing device is further to:

detect that the first contributed test re-executes successfully;

receive historical data for the first contributed test, wherein the historical data comprises a total number of successful executions of the first contributed test during previous executions;

determine that the total number of successful executions of the first contributed test during previous executions meets an SLA success threshold;

update an ownership attribute for the first contributed test to indicate that ownership of the first contributed test has been transferred from the consumer system; and indicate to the consumer system that ownership of the first contributed test has been transferred from the consumer system.

16. The system of claim 14, wherein the processing device is further to:

receive historical data for the first contributed test, wherein the historical data comprises a total number of failures of the first contributed test during previous executions;

determine that a total number of failures of the first contributed test during previous executions meets an SLA failure threshold; and indicate to the consumer system that the first contributed test has violated the SLA failure threshold.

17. The system of claim 14, wherein the processing device is further to:

pause deployment of the code update for the application component within the deployment pipeline;

disable the first contributed test within the deployment pipeline; and indicate to the consumer system that the first contributed test has failed.

* * * * *